United States Patent [19]

Adachi

[11] Patent Number: 5,361,820
[45] Date of Patent: Nov. 8, 1994

[54] PNEUMATIC RADIAL TIRE

[75] Inventor: Yukishige Adachi, Hyogo, Japan

[73] Assignee: Sumitomo Rubber Industries, Ltd., Hyogo, Japan

[21] Appl. No.: 953,212

[22] Filed: Sep. 30, 1992

[30] Foreign Application Priority Data

Sep. 30, 1991 [JP] Japan .................. 3-278380
Sep. 30, 1991 [JP] Japan .................. 3-278381

[51] Int. Cl.$^5$ .................. B60C 1/00; B60C 13/00; B60C 15/06
[52] U.S. Cl. .................. 152/555; 152/458; 152/525; 152/541; 152/546; 152/547; 152/554
[58] Field of Search .................. 152/554-555, 152/458, 546, 517, 549, 552-553, 539, 541, 547, 525

[56] References Cited

U.S. PATENT DOCUMENTS

| | | | |
|---|---|---|---|
| 3,050,098 | 8/1962 | Grote | 152/458 |
| 3,760,858 | 9/1973 | Grossett | 152/554 X |
| 3,945,420 | 3/1976 | Görter | 152/458 X |
| 4,067,372 | 1/1978 | Masson | 152/458 |
| 4,236,563 | 12/1980 | Moers et al. | 152/458 |
| 4,929,684 | 5/1990 | Roland et al. | 152/525 X |
| 5,049,610 | 9/1991 | Takaki et al. | 152/547 X |
| 5,173,136 | 12/1992 | Agarwal | 152/525 X |

FOREIGN PATENT DOCUMENTS

| | | | |
|---|---|---|---|
| 0461329 | 12/1991 | European Pat. Off. | 152/525 |
| 1355014 | 2/1964 | France . | |
| 3242323 | 6/1983 | Germany . | |
| 3314563 | 11/1983 | Germany . | |
| 54-132903 | 10/1979 | Japan | 152/547 |
| 58-174004 | 10/1983 | Japan | 152/517 |
| 62-299412 | 12/1987 | Japan | 152/547 |
| 2162102 | 6/1990 | Japan | 152/525 |
| 3-28243 | 2/1991 | Japan | 152/547 |
| 1003580 | 9/1965 | United Kingdom . | |

OTHER PUBLICATIONS

*Mechanics of Pneumatic Tires*, ed. Samuel Clark: U.S. Department of Transportation, Aug. 1981, p. 882.
JP63170109–Abstract–Jul. 14, 1988, Yasumi et al.
JP2162102–Abstract–Jun. 21, 1990, Masaki et al.
JP2057410–Abstract–Feb. 27, 1990, Akira et al.

*Primary Examiner*—Michael W. Ball
*Assistant Examiner*—Adrienne C. Johnstone
*Attorney, Agent, or Firm*—Birch, Stewart, Kolasch & Birch

[57] ABSTRACT

An object of the present invention is to provide a pneumatic radial tire that has the carcass layer composed of a single ply of carcass cords to reduce the tire weight and improve the tire production rate and which insures a sufficiently high lateral spring constant to maintain good maneuverability. According to the present invention, the pneumatic radial tire comprises annular tread portions a pair of sidewalls that extend from opposite ends of the tread portion in the radial direction of the tire, a pair of bead portions that are provided at the ends of the sidewalls and each of which has a bead core embedded therein, a carcass layer composed of carcass cords that are arranged in the radial direction of the tire as they are folded around the bead core at each end and which extend through both sidewalls and tread portion, and breaker layers that are arranged in the external radial part of the carcass layer. The carcass layer is formed of a single ply of carcass cords.

13 Claims, 2 Drawing Sheets

PNEUMATIC RADIAL TIRE

BACKGROUND OF THE INVENTION

1. Field of the invention

The present invention relates to a pneumatic radial tire comprising an annular tread portion, a pair of sidewalls that extend from both ends of the tread portion in the radial direction of the tire, a pair of bead portions that are provided at the ends of the sidewalls to engage a wheel rim on which the tire is to be mounted in use, a carcass layer that extends through the tread portion and the sidewalls to engage the bead portions, and breaker layers that are arranged in the tread portion in the external radial part of the carcass layer.

2. Description of Related Art

Radial tires are far superior to bias tires in many aspects including fuel economy, life (endurance) and maneuverability, and today radial tires dominate the market of pneumatic tires.

A pneumatic radial tire comprises an annular tread portion, a pair of sidewalls that extend from both ends of the tread portion in the radial direction of the tire, a pair of bead portions that are provided at the ends of the sidewalls to engage a wheel rim on which the tire is to be mounted in use, a carcass layer that is composed of cords that are arranged in the radial direction of the tire as they are engaged at both ends with the bead portions and which extend through both sidewall portions and the tread portion, and beaker layers of high rigidity that are arranged in the external radial part of the carcass layer.

The carcass of radial passenger tires which are generally required to have high maneuverability is composed of two plies in order to provide enhanced lateral rigidity. As recent models of vehicles are designed to run with higher fuel efficiency, the requirements for lighter tires have become more rigorous than ever before. Using a smaller number of plies in the carcass is effective in reducing a substantial portion of the tire weight, for example, a changeover from two-ply to one-ply carcass is effective in reducing a substantial portion of the tire weight but, at the same time, the lateral rigidity of the tire is lowered to impair its maneuverability, in particular, its cornering performance.

SUMMARY OF THE INVENTION

An object of the present invention is to provide a pneumatic radial tire that has the carcass layer composed of a single ply of carcass cords to reduce the tire weight and improve the tire production rate and which insures a sufficiently high lateral spring constant to maintain good maneuverability.

A pneumatic radial tire of the present invention comprises an annular tread portion, a pair of sidewalls that extend from opposite ends of the tread portion in the radial direction of the tire, a pair of bead portions that are provided at the ends of the sidewalls and each of which has a bead core embedded therein, a carcass layer composed of carcass cords that are arranged in the radial direction of the tire as they are folded around the bead core at each end of the carcass and which extend through both sidewall portions and the tread portion, and breaker layers that are arranged in the external radial part of the carcass layer. The carcass layer of this tire is formed of a single ply of carcass cords and the sidewall portions are formed of a fiber-reinforced rubber (FRR) that contains short fibers in an amount of 5 to 15% (by weight) which are aligned at an angle of no more than 45 degrees (desirably parallel or zero degrees) with respect to the tangent to the carcass, which rubber has a hardness (JISA hardness) of 70 to 90 degrees. Because of this structure and composition, the bending rigidity of the sidewall portions in areas that extend from the buttress portion to the position of a maximum width is enhanced to insure a high enough lateral spring constant to maintain good maneuverability while reducing the weight of the tire.

Further, a pneumatic radial tire of the present invention comprises an annular tread portion, a pair of sidewalls that extend from opposite ends of the tread portion in the radial direction of the tire, a pair of bead portions that are provided at the ends of the sidewalls and each of which has a bead core embedded therein, a carcass layer composed of carcass cords that are arranged in the radial direction of the tire and which extend through both sidewall portions and the tread portion, and breaker layers that are arranged in the external part of the carcass layer. This tire is characterized in that the carcass layer is formed of a single ply of carcass cords that are folded around the bead core at each end of the carcass in such a way that the ends of the turnups extend to a position below the breaker layers, namely to a position where those ends lie just beneath the breaker layers within the range defined by the width of the breaker layers, and with a rubber layer being provided between the carcass body (located between the two bead cores) and the turnups (located in the sidewall portions outside the carcass body) in such a way that it extends from below the breaker layers to reach at least the position of a maximum tire width, the thickness H of said rubber layer being greater than the diameter d of each carcass cord but smaller than 10 times the diameter d of each carcass cord, said rubber layer having a hardness (JIS hardness) of 60 to 100 degrees. Because of this structure and composition, the bending rigidity of the sidewall portions in areas that extend from the buttress portion to the maximum width position is enhanced to insure a high enough lateral spring constant to maintain good maneuverability while reducing the weight of the tire.

The bending rigidity of the sidewall portions can be further enhanced by forming the rubber layer of a fiber-reinforced rubber (FRR).

DETAILED DESCRIPTION OF THE REFERRED EMBODIMENTS

Figure 1:
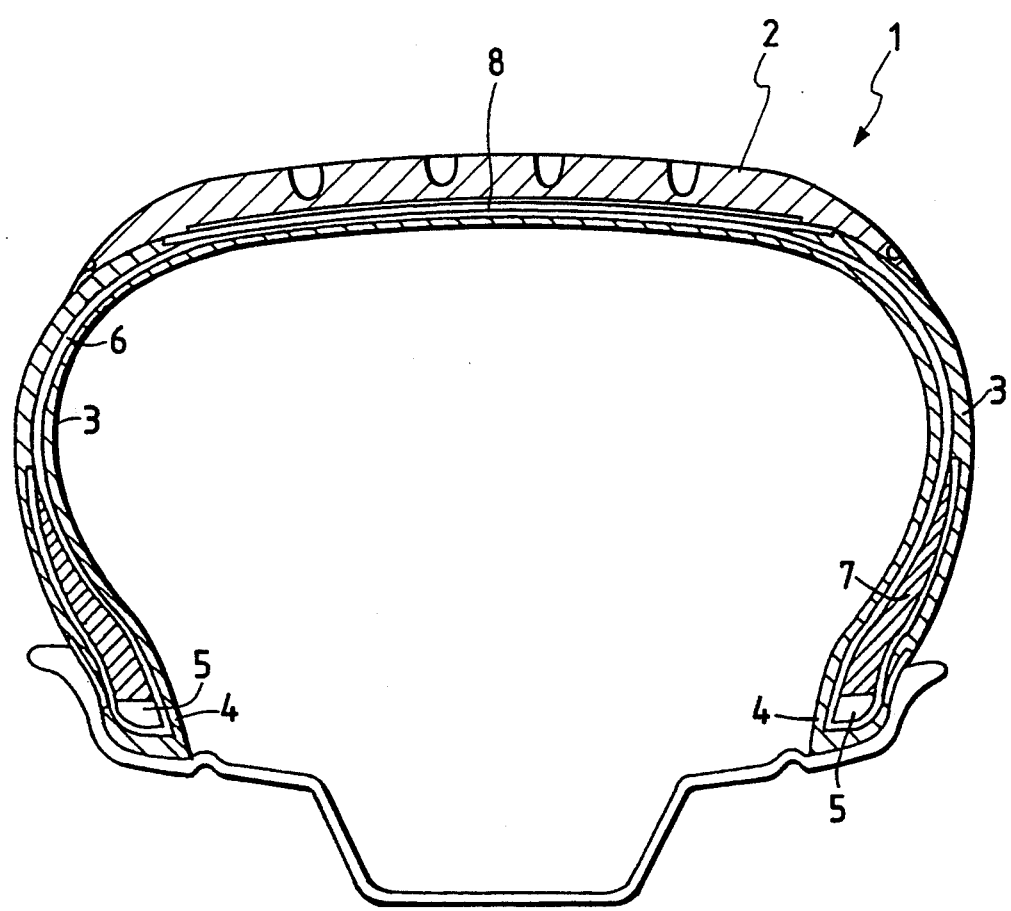
FIG. 1 shows in partial cross section a pneumatic radial tire of a first embodiment of the present invention.

FIG. 1 shows in partial cross section a pneumatic radial tire of a first embodiment, as taken widthwise, that incorporates the concept of the present invention. As shown, the pneumatic radial tire generally indicated by 1 comprises an annular tread portion 2, a pair of sidewalls 3 that extend from opposite ends of the tread portion 2 in the radial direction of the tire, a pair of bead portions 4 that are provided at the internal radial ends of the sidewalls 3 and each of which has an annular bead core 5 embedded therein, a single-ply carcass layer 6 that is composed of carcass cords that are arranged in the radial direction of the tire as they are folded around the bead core 5 at each end and which extend through both sidewalls 3 and the tread portion 2, bead apexes 7 tapering upward that are made of hard rubber having a JISA hardness of 70 to 90 degrees and which are arranged in the external radial parts of the bead cores 5, and a breaker layer 8 composed of two or more plies that are arranged in the external radial part of the carcass layer 6 and each of which is an alignment of two or more parallel breaker cords formed by twisting steel filaments together.

The sidewall portions 3 are formed of a fiber-reinforced rubber (FRR) that is a rubber containing short fibers of such polymers as nylon, vinylon, rayon or Kevlar that are present in an amount of 5 to 15% (by weight) and which are aligned at an angle of no more than 45 degrees (desirably parallel or zero degrees) with respect to the tangent to the carcass, said FRR having a JISA hardness of 70 to 90 degrees. If the content of short fibers is less than 5%, the rigidity of the sidewall portions 3 cannot be enhanced; if their content is more than 15%, the rubber cannot be extrusion molded. If the short fibers are aligned at an angle exceeding 45 degrees with respect to the tangent to the carcass, the rigidity to a lateral displacement that will occur when the pneumatic radial tire 1 is placed under load cannot be sufficiently enhanced to help improve the lateral spring constant of the tire.

The structure described above is effective in enhancing the rigidity of the sidewall portions 3 and although the carcass layer 6 is made of a single ply of carcass cords, the bending rigidity of the sidewall portions 3 in areas that extend from the buttress portion which absorbs the deflection of the tire when the tire is placed under load to the position of a maximum tire width can be increased satisfactorily.

If the turnups at opposite ends of the carcass layer 6 are designed to extend to a position below the breaker layer 8, the carcass layer 6 can effectively be regarded as consisting of two plies in the sidewall portions 3 and this further enhances the bending rigidity of those sidewall portions 3.

A tire sample was constructed in accordance with the present invention. In addition, samples of other tire constructions were prepared as set forth below. Experiments were conducted on those tire samples and the results are shown in Table 1.

The tire of Example 1 (Tire 1) was constructed in accordance with the present invention; it had a single-ply carcass layer and the sidewall portions were formed of a fiber-reinforced rubber, with short fibers being aligned at an angle of 45 degrees with respect to the tangent to the carcass.

The tire of Comparative Example 1 was the same as Tire 1 except that the short fibers were aligned at an angle of 90 degrees with respect to the tangent to the carcass.

The tire of Comparative Example 2 was a conventional tire using a two-ply carcass layer.

The tire of Comparative Example 3 was the same as above except that the carcass layer was formed of a single ply.

Each tire sample had a size of 195/65R15.

TABLE 1

|  | Tire weight | Longitudinal spring constant | Lateral spring constant | Maneuverability |
|---|---|---|---|---|
| Example 1 | 92 | 100 | 100 | 3 |
| Comparative Example 1 | 92 | 96 | 97 | 2.5+ to 3− |
| Comparative Example 2 | 100 | 100 | 100 | 3 |
| Comparative Example 3 | 92 | 94 | 93 | 2.5 |

In Table 1, the values of tire weight, longitudinal spring constant and lateral spring constant are shown in terms of index with the values for the sample of Comparative Example 2 being taken as 100. Maneuverability was evaluated by a subjective outdoor-track test in which a domestic passenger car having a piston displacement of 2,000 cc as equipped with one of the four tire samples was caused to run on a proving ground.

As one can see from Table 1, the use of a single-ply carcass layer was effective in reducing the tire weight; however, the longitudinal and lateral spring constants decreased so much as to deteriorate the maneuverability of the tire (Comparative Example 3). The tire of Example 1 in which the sidewall portions 3 were formed of a fiber-reinforced rubber that had the short fibers aligned at an angle of 45 degrees with respect to the tangent to the carcass was lighter in weight and yet the lateral spring constant was maintained at a sufficiently high level to insure good maneuverability.

When the short fibers in the FRR were aligned at an angle of 90 degrees with respect to the tangent to the carcass (Comparative Example 1), the strength and hardness of the rubber in the sidewall portions 3 increased to provide higher rigidity; however, no improvement was achieved in lateral spring constant and this led to poor maneuverability.

The pneumatic radial tire of first embodiment of the present invention which is constructed in the manner described above offers the following advantages. Since the carcass layer is composed of a single ply of carcass cords, the tire weight can be reduced. In addition, the sidewall portions are formed of a fiber-reinforced rubber that contains short fibers in an amount of 5 to 15% (by weight) as they are aligned at an angle of no more than 45 degrees (desirably parallel or zero degrees) with respect to the tangent to the carcass. Further, the rubber has a hardness of 70° to 90°. As a result, the bending stiffness of the sidewalls in areas that extend from the buttress portion to the position of a maximum width can be enhanced to insure a high enough lateral spring constant to provide good maneuverability, in particular good cornering performance.

A second embodiment of the present invention will now be described hereinblow.

Figure 2:
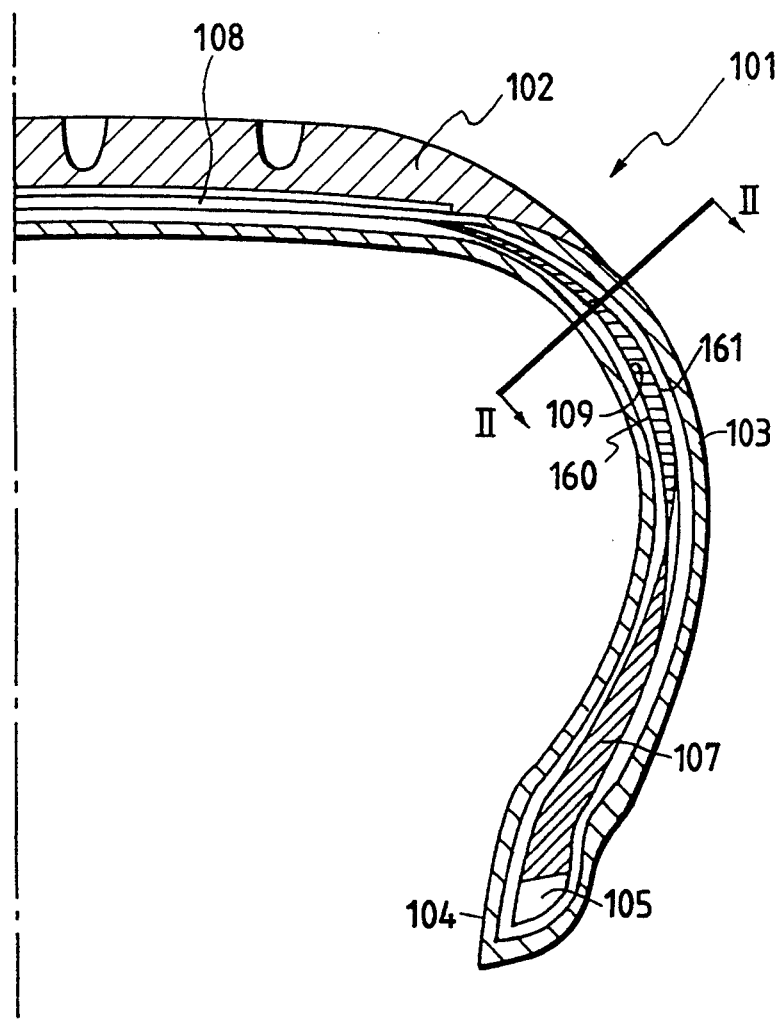
FIG. 2 shows in partial cross section a pneumatic radial tire of a second embodiment of the present invention.

FIG. 2 shows in partial cross section a pneumatic radial tire of the second embodiment of the present invention. As shown, the pneumatic radial tire generally indicated by 101 comprises an annular tread portion 102, a pair of sidewalls 103 that extend from opposite ends of the tread portion 102 in the radial direction of the tire, a pair of bead portions 104 that are provided at the internal radial ends of the sidewalls 103 and each of which has an annular bead core 105 embedded therein, a single-ply carcass layer 106 that is composed of carcass cords that are arranged in the radial direction of the tire as they are folded around the bead core 105 at each end and which extend through both sidewalls 103 and the tread portion 102, bead apexes 107 that are made of a hard rubber having a JISA hardness of 50 to 100 degrees and which are arranged in the external radial parts of the bead cores 105 at and a breaker layer 108 composed of two or more plies that are arranged in the external radial part of the carcass layer 106 and each of which is an alignment of two or more parallel breaker cords formed by twisting steel filaments together.

The single-ply carcass layer 106 is folded around the bead core 105 at each end and the tip of each turnup 161 extends to a position below the breaker layer 108, namely to a position where said tip lies just beneath the breaker layer 108 within the range defined by the width B of said breaker layer 108.

Because of this structure, the carcass 106 can effectively be regarded as consisting of two plies in the sidewalls 103 and the bending rigidity of the carcass 106 in an area that extends from the buttress portion which absorbs the deflection of the tire when the tire is placed under load to the position of a maximum width can be increased satisfactorily.

A rubber layer 109 made of a rubber having a JISA hardness of 60 to 100 degrees is provided between the body 160 of the carcass 106 (extending between the two bead cores 105) and the each turnup 161. This rubber layer 109 is such that its upper end is located beneath the breaker layer 108 whereas its lower end extends to the maximum width position where the tire width W is at a maximum. If the upper end of either bead apex 107 does not reach the maximum width position, the lower end of the rubber 109 is so designed as to reach the upper end of each bead apex 107.

This structure is effective in further enhancing the bending rigidity of the sidewalls 103 in areas that extend from the buttress portion to the maximum width position, whereby the lateral spring constant is insured to provide good maneuverability, in particular high cornering performance.

Figure 3:
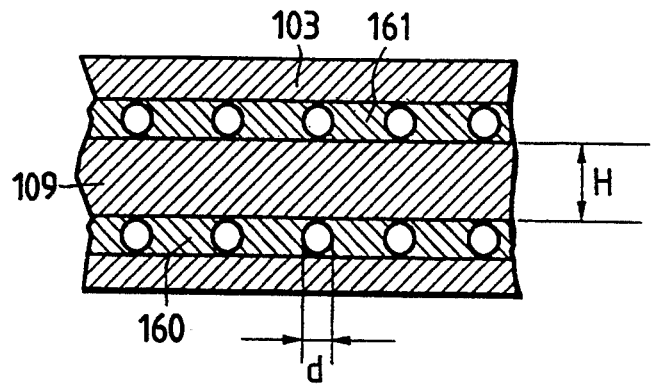
FIG. 3 is a cross section of FIG. 1 as taken on line II—II of FIG. 2.

According to the present invention, the thickness H of the rubber layer 109 is greater than the diameter d of each carcass cord in the carcass 106 but smaller than 10 times the diameter d of each carcass cord (see FIG. 3). If the thickness H of the rubber layer 109 is smaller than the diameter d of each carcass cord, the bending rigidity of the sidewalls 103 cannot be adequately enhanced. If the thickness H of the rubber layer 109 is greater than 10 times the diameter d of each carcass cord, the portion of interest will have such a high bending rigidity that it will experience less deflection, accompanied by impaired initial response to lateral displacement.

In a preferred embodiment, the rubber layer 109 may be formed of a fiber-reinforced rubber (FRR) that contains short fibers of such polymers as nylon, vinylon, rayon or Kevlar to provide higher strength and hardness. This is effective in enhancing the bending rigidity of the sidewalls 103 without increasing the thickness H of the rubber layer 109.

A tire sample was constructed in accordance with the present invention. In addition, samples of other tire constructions were prepared as set forth below. Experiments were conducted on those tire samples and the results are shown in Table 2.

Example I was constructed in accordance with the present invention; the carcass layer of this tire had a single ply of carcass cords and each of its turnups was caused to extend to a position below the breaker layer, with a rubber layer being provided between the carcass body and each turnup; the rubber layer had a thickness H of 7 mm (H > 10d) and a length of 50 mm.

Example II was the same as Example I except that the thickness H of the rubber layer was decreased to 3 mm.

Example III was the same as Example II except that the the side wall was made of the same material as the rubber layer.

Comparative Example I was a conventional tire using a two-ply carcass layer, in which the edge of each turn up of the carcass located externally was positioned at the position of maximum tire width.

Comparative Example II was such that the carcass layer was formed of a single ply of carcass cords, with the edge of each turnup of the carcass being positioned at the position of a maximum tire width.

Comparative Example III was such that the carcass layer was formed of a single ply of carcass cords, with the end of each turnup being extended to a position just below the breaker layer but without providing a rubber layer between the carcass body and each turnup.

Each tire sample had a size of 195/65R15 with the diameter (d) of each carcass cord being 0.68 mm.

TABLE 2

|  | Example 1 | Example 2 | Example 3 | Comparative Example 1 | Comparative Example 2 | Comparative Example 3 |
| --- | --- | --- | --- | --- | --- | --- |
| Tire weight | 99 | 96 | 96 | 100 | 92 | 93 |
| Longitudinal spring constant | 102 | 99 | 103 | 100 | 94 | 96 |
| Lateral spring constant | 101 | 100 | 104 | 100 | 93 | 95 |
| Maneuverability | 3.5 | 3.5 | 4 | 3 | 2.5 | 3 |
| Thickness of rubber layer, mm | 7 | 3 | 3 | — | — | — |
| (Thickness of rubber layer)/(diameter of carcass cord) | 10.3 | 4.4 | 4.4 | — | — | — |
| Length of rubber layer, mm | 50 | 50 | 50 | — | — | — |
| Direction of alignment of short fibers in rubber layer | 45° | 45° | 45° | — | — | — |
| Direction of alignment of short fibers in sidewalls | — | — | 45° | — | — | — |
| Number of carcass plies | 1 | 1 | 1 | 2 | 1 | 1 |
| Position of the end of each turnup of | beneath the breaker layer | beneath the breaker layer | beneath the breaker layer | maximum width position | maximum width position | maximum width breaker layer |

In Table 2, the value of tie weight, longitudinal spring constant and lateral spring constant are shown in terms of index with the values for the prior art sample (Comparative Example I) being taken as 100. Initial response and cornering performance were evaluated by a subjective outdoor-track test in which a domestic passenger car having a piston displacement of 2,000 cc as equipped with one of the five tire samples was caused to run on a proving ground; the higher the values, the better the performance.

As one can see from Table 2, the use of a single-ply carcass layer was effective in reducing the tire weight; however, the lateral spring constant decreased so much as to deteriorate the maneuverability of the tire (Comparative Example II). When the end of each turnup of the carcass layer was extended to a position beneath the breaker layer, the drop in lateral spring constant was sufficiently suppressed to prevent the deterioration of maneuverability (Comparative Example III).

In Example II, the end of each turnup of the single-ply carcass layer was extended to a position below the breaker layer and the rubber layer having a thickness (H) of 3 mm and a length of 50 mm was provided between the carcass body and each turnup; this tire was lighter in weight and yet the lateral spring constant was maintained at a sufficiently high level to insure good maneuverability.

In Example I, the thickness (H) of the rubber layer between the carcass body and each turnup was greater than 10 times the diameter (d) of each carcass cord (H>10d); this tire was heavy and the longitudinal spring constant increased to cause poor ride characteristics.

The present invention is capable of reducing the weight of a pneumatic radial tire. At the same time, it insures a high enough lateral spring constant to provide good maneuverability, in particular, high cornering performance.

What is claimed is:

1. A pneumatic radial tire comprising:
   an annular tread member;
   a pair of sidewalls extending from opposite ends of the tread portion in the radial direction of the tire;
   a pair of bead members provided at the ends of the sidewalls and each of which has a bead core embedded therein and a pair of bead apexes of a gradually reducing thickness toward a maximum tire width;
   a carcass layer including carcass cords arranged in the radial direction of the tire, said carcass layer extending through both sidewall portions and said tread member;
   breaker layers arranged in the external radial part of the carcass layer,
   wherein said carcass layer is formed of a single ply of carcass cords that are folded around said bead core at each end of the carcass in such a way that turned-up ends of the carcass layer extend to a position beneath said breaker layer within a range defined by a width of said breaker layer; and
   a rubber layer being provided between said carcass layer and the turned-up ends of said carcass layer in such a way that said rubber layer extends from below said breaker layer and terminates at an upper end of a respective bead apex.

2. The pneumatic radial tire according to claim 1, wherein a thickness of said rubber layer is greater than a diameter of each carcass cord but smaller than 10 times the diameter of each carcass cord, said rubber layer having a JISA hardness of 60 to 100 degrees.

3. The pneumatic radial tire according to claim 1, wherein said rubber layer is formed of a fiber-reinforced rubber containing short fibers.

4. The pneumatic radial tire according to claim 3, wherein said short fibers are in an amount of 5 to 15% by weight, and said short fibers are aligned at an angle of no more than 45 degrees with respect to the tangent to said carcass, said rubber having a JISA hardness of 70 to 90 degrees.

5. The pneumatic radial tire according to claim 1, wherein the sidewall portions are formed of a fiber-reinforced rubber containing short fibers in an amount of 5 to 15% by weight, and said short fibers are aligned at an angle of no more than 45 degrees with respect to the tangent to the carcass, said rubber having a JISA hardness of 70 to 90 degrees.

6. The pneumatic radial tire according to claim 3, wherein said short fibers are fibers one of nylon, vinylon, rayon and aramid (Kevlar).

7. The pneumatic radial tire according to claim 2, wherein said rubber layer is formed of a fiber-reinforced rubber containing short fibers.

8. The pneumatic radial tire according to claim 2, wherein the sidewall portions are formed of a fiber-reinforced rubber containing short fibers in an amount of 5 to 15% by weight, and said short fibers are aligned at an angle of no more than 45 degrees with respect to the tangent to the carcass, said rubber having a JISA hardness of 70 to 90 degrees.

9. The pneumatic radial tire according to claim 3, wherein the sidewall portions are formed of a fiber-reinforced rubber containing short fibers in an amount of 5 to 15% by weight, and said short fibers are aligned at an angle of no more than 45 degrees with respect to the tangent to the carcass, said rubber having a JISA hardness of 70 to 90 degrees.

10. The pneumatic radial tire according to claim 4, wherein the sidewall portions are formed of a fiber-reinforced rubber containing short fibers in an amount of 5 to 15% by weight, and said short fibers are aligned at an angle of no more than 45 degrees with respect to the tangent to the carcass, said rubber having a JISA hardness of 70 to 90 degrees.

11. The pneumatic radial tire according to claim 4, wherein said short fibers are fibers one of nylon, vinylon, rayon and aramid (Kevlar).

12. The pneumatic radial tire according to claim 5, wherein said short fibers are fibers one of nylon, vinylon, rayon and aramid (Kevlar).

13. The pneumatic radial tire according to claim 1, wherein said rubber layer is of a substantially constant thickness and tapers at opposing ends thereof.

* * * * *